(12) United States Patent
Reid

(10) Patent No.: X9220
(45) Date of Patent: Oct. 31, 1835

(54) TRUSS, SPRING

(76) Inventor: Henry Reid

Henry Reid.
(647)
Letters Patent.

The Schedule referred to in these Letters Patent and making part of the same containing a description in the words of the said Henry Reid himself of his improvement in the Spring Truss.

---

To all to whom these presents shall come.
Be it known that I Henry Reid of the City of Augusta in the County of Richmond and State of Georgia have invented a new and useful improved independent Spring Truss, for the immediate and permanent relief and probable cure of those who are afflicted with inguinal scrotal and umbilical hernia (or rupture) and the following is a full and exact description thereof. This improved independent Spring Truss which I have invented consists of a steel plate about three fourths of an inch broad, and about one twelfth of an inch thick at each end, with a gradual diminution of the thickness from each end to the middle of the plate. On each end of the plate three small holes are drilled in the form of an equilateral triangle behind which a neck somewhat round of one inch in length is formed. The side of the plate next to the body is swedged, that is, the corners rounded; The truss extends from the centre of the abdominal ring on the right side in the shortest direction around the loins and back, and terminates on the centre of the abdominal ring on the left side. The plate is curved to fit the patient so as to make the perforated ends rest upon the abdominal rings. The whole plate (except the necks at each end) must receive a good spring temper. The pad is an oval block of wood, for a man of common stature, in the proportion of three inches long two inches broad, and one inch thick convex on the one side and plane on the other side, resembling resembling very much, the one half of a goose egg, divided longi
-tudinally. The size of the block however must be adapted to the
necessity of the case according to the judgment of the surgeon
in attendance. The block is attached to the spring by small wood screws
three eighths of an inch in length; the plane side of the block comes
in contact with the oblated ends of the spring the large end of the
block is next to the pubis. A short second spring of similar
strength with three small holes drilled at each end in the form of an equi
lateral triangle, extending from the abdominal block to the umbilicus
with a circular block in the proportion of two inches diameter.
and one inch thick, convex one one side and plane on the other
may be added in all cases of umbilical hernia; The size of
this block also must be adapted by the surgeon to the necessity
of the case; both springs are wrapped neatly with a strip of
soft flannel. This truss differs from Halls, Marshes, Stagners
and all others in passing from one groin behind the pelvis and
around the other groin, and presses with equal force on the soft
part above the brim of the pelvis on each side before with a
lateral and inward pressure, having its points of pressure
before the anterior edge of the lateral parts of the great pelvis
so as to ensure its retention in its place. It differs from Halls
and Marshes in the peculiar shape of the block by which the immediate
pressure is made, and in the immobility of the blocks, and in
the pressure being made by blocks instead of pads or cushions. It differs
from Stagners in having simply spring power and that so adjusted
to the parts as to retain its adjustment without the aid of belt,
buckle and straps or any other means except the spring power.
Application— If the patient be afflicted on one side only, let a soft
pad of flannel be attached to the end of the truss, which is to come in
contact with the sound abdominal ring, then let the truss be applied
by the surgeon and the wooden block so placed as that the apex or centre
of convexity will coincide with the centre of the defective abdominal
ring and its lower side with the crest of the bone immediately under the
ring.

ring. The pressure must never be so great as to produce external infla
mation, the pressure can be graduated by the surgeon or Patient
bending in or out the untempered ends of the Truss. In all cases th
block must be adjusted to the parts before it is fastened to the spring.
The umbilical Spring is not necessary in common cases, but when
used it must be carefully adjusted to the part afflicted and
fastened by small wood screws to the abdominal block. It w[illegible]
be well for those who can afford it to have the convex surfa
of the block covered with a thin plate of silver or gold. The stee
plate ought to be varnished and anointed with sweet oil once
every month to prevent rust.

Advantages. This Truss will suit equally well the
afflicted of both sexes it will be peculiarly useful to the [illegible]
accoucheur in all cases of parturition complicated by herni
because its operation is without straps, which cannot b
well applied in the latter stages of pregnancy or in labor,
and will by its pressure prevent the necessity of an assistan
or the use of one of the accoucheurs hands for preventing
protrusion. It will not prevent attention to the ordinary
business of life as its retentive power can be overcome by
violent efforts only nor will it prevent dressing in the
most fashionable manner as it requires neither belt
strap nor buckle to keep it in its proper place.

N.B Let the surgeon get the exact size of his patient by
passing a flexible wire around his body, and have the
Truss prepared accordingly. What I claim as my own
invention and not previously known in the above des=
cribed improved independent Spring Truss is that it
passes from one abdominal ring round the loins & back
to the other abdominal ring and maintains permanently equable pressu
on the soft parts above the brim of the pelvis on each side, without the aid o[f]
belt strap buckle or any other appendage whatsoever, and I claim also the
short curved Spring passing from the groin to the umbilicus October [illegible]

Witnesses, Jesse Kent
Sal Bynon (1188 Words)

H. Reid